(12) United States Patent
Klein et al.

(10) Patent No.: US 9,019,220 B1
(45) Date of Patent: Apr. 28, 2015

(54) BASELINE CHARGE COMPENSATION (75) Inventors: Hans W. Klein, Pleasanton, CA (US); Paul Walsh, Cork (IE); Keith O'Donoghue, Cork (IE); Roman Ogirko, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 283 days.

(21) Appl. No.: 13/612,696

(22) Filed: Sep. 12, 2012

Related U.S. Application Data (60) Provisional application No. 61/610,927, filed on Mar. 14, 2012.

(51) Int. Cl.
  *G06F 3/041* (2006.01)
  *G06F 3/044* (2006.01)
(52) U.S. Cl.
  CPC .................................... *G06F 3/044* (2013.01)
(58) Field of Classification Search
  CPC ......................................................... G06F 3/044
  USPC ......................................................... 345/173
  See application file for complete search history.

(56) References Cited

U.S. PATENT DOCUMENTS

| 7,337,085 | B2 | 2/2008 | Soss |
| 7,567,240 | B2 | 7/2009 | Peterson, Jr. |
| 8,026,904 | B2 | 9/2011 | Westerman |
| 2003/0210235 | A1 | 11/2003 | Roberts |
| 2007/0074913 | A1* | 4/2007 | Geaghan et al. ........... 178/18.06 |
| 2009/0153152 | A1 | 6/2009 | Maharyta |
| 2011/0186359 | A1 | 8/2011 | Chen |
| 2012/0050210 | A1 | 3/2012 | King |

OTHER PUBLICATIONS

Kannan Srinivasagam, et al., Differentiating Noise from Real Touch: The Key to Robust Capacitive Sensing, <URL:http://www.eetimes.com/design/medical-design/4210070/Differentiating-noise-from-real-touch--the-key-to-robust-capacitive-sensing>, Oct. 25, 2010, Accessed Sep. 12, 2012.

* cited by examiner

*Primary Examiner* — Viet Pham (57) ABSTRACT

A compensation circuit may include a current source configured to control an amplitude of a current pulse, a memory configured to store a plurality of duration values each corresponding to a set of one or more sensor electrodes of a plurality of sensor electrodes, and a pulse width controller configured to control a duration of the current pulse based on a first duration value of the plurality of duration values, and to apply the current pulse to a compensation node of a capacitance sensor during a measurement cycle for a first set of one or more sensor electrodes, where the first set of one or more sensor electrodes corresponds to the first duration value.

20 Claims, 6 Drawing Sheets

BASELINE CHARGE COMPENSATION

RELATED APPLICATIONS

This application claims priority to U.S. Provisional Application No. 61/610,927, filed on Mar. 14, 2012, which is hereby incorporated by reference.

TECHNICAL FIELD

This disclosure relates to the field of touch-sensors and, in particular, to compensation of baseline capacitance in a capacitance sensing system.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch sensor pad replicates X/Y movement using a collection of capacitive sensor electrodes, arranged along two defined axes, that detect the presence or proximity of one or more conductive objects, such as a finger. Mouse right/left button clicks can be replicated by two mechanical or capacitive-sensed buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for determining movement of the conductive object in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). Such overlays allow a display to be used as an input device, removing the keyboard and/or the mouse as the primary input device for interacting with the displayed image's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment of a touch-screen sensing application, a touch screen controller may stimulate and sense a response of a touch sensor. For example, such a touch screen controller may include a capacitance sensor that applies a signal to a transmit (TX) sensor electrode to induce a signal on a receive (RX) sensor electrode that is capacitively coupled with the TX sensor electrode. The signal induced at the RX sensor electrode may be integrated and measured by a RX circuit, also referred to as an RX channel, as an amount of charge.

In one embodiment, a baseline charge is an amount of charge that is attributable to the parasitic capacitance measurable for an intersection between a pair of sensor electrodes. Thus, a capacitance sensor may detect the baseline amount of charge between two sensor electrodes even when no finger or other conductive object is proximate to the intersection between the sensor electrodes.

In one embodiment, in order to detect a small amount of change in the presence of a large baseline, a touch sensor controller may add charge to the receive signal in order to compensate for the baseline charge. For example, an amount of compensation charge equal to the amount of the received baseline charge may be subtracted so that a greater portion of the remaining charge resulting from a change in capacitance due to the proximity of an actual finger or other conductive object may be more easily measured. In one embodiment, the compensation of baseline charge may allow the capacitance sensor to have a higher dynamic range and operate in a smaller die size and at lower power.

In one embodiment, a touch sensor controller may be calibrated to compensate for varying baseline capacitances, which may vary according to the size, construction technology, and other characteristics of the sensor panel being sensed. One mechanism for controlling the amount of baseline charge that is compensated is based on pulse-width control. In one embodiment, the amount of baseline charge that is compensated may be programmable, and may be different for each intersection of sensor electrodes.

In one embodiment, a compensation circuit for a touch screen controller may include a current source that outputs a predetermined amount of current. The compensation circuit may also include a pulse width controller (PWC) that controls the duration for which the current is applied to a compensation node of the capacitance sensor.

The resulting current pulse delivers an amount of charge that can be adjusted to match the baseline charge. In one embodiment, this may be accomplished by adjusting the width of the current pulse using the PWC. In one embodiment, a memory may be used to store duration values corresponding to pairs of sensor electrodes, identifying specific intersections between those pairs of sensor electrodes. The PWC may then adjust the widths of the current pulses applied to the compensation node based on the stored duration values to accurately compensate for baseline capacitances specific to each intersection or subset of intersections.

Figure 1:
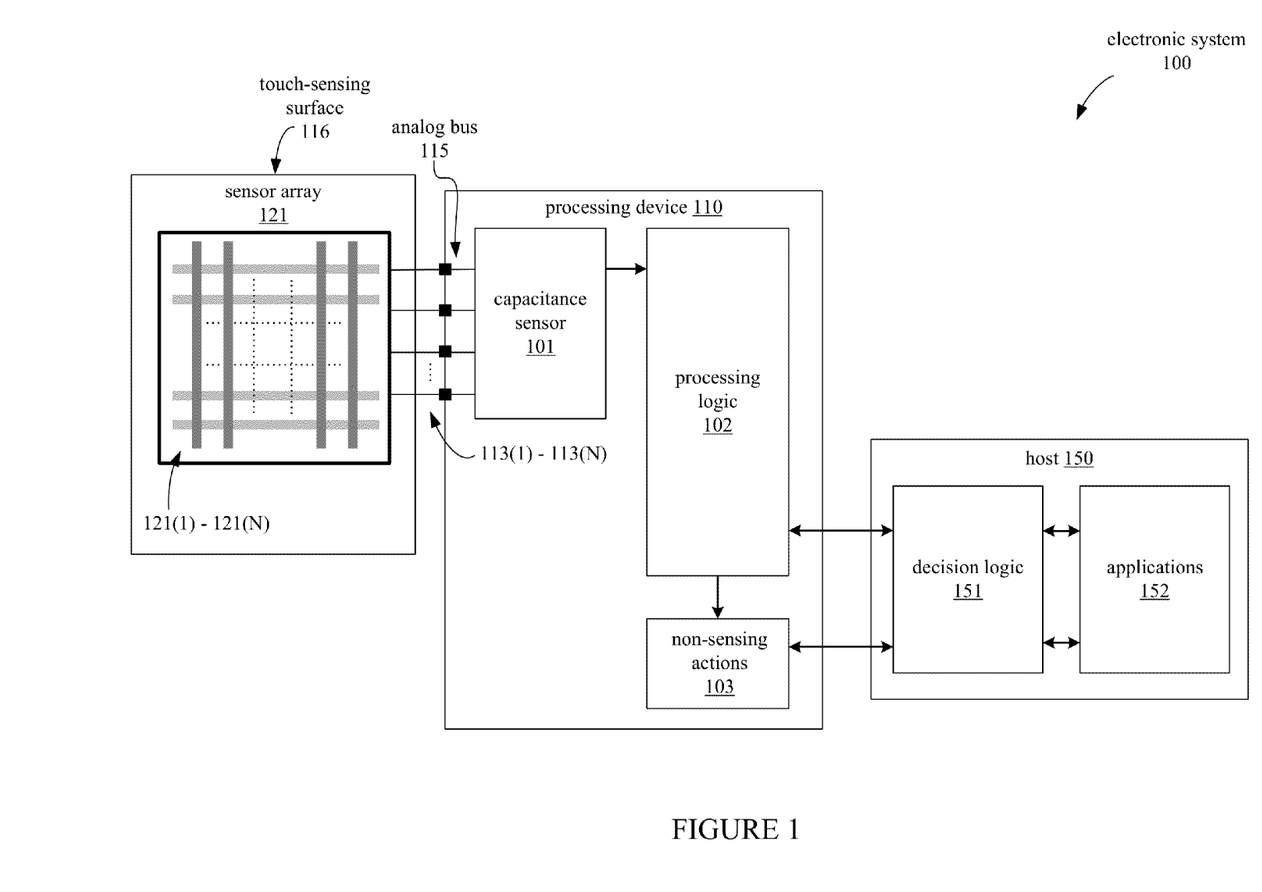
FIG. 1 is a block diagram illustrating an embodiment of an electronic system that processes touch sensor data.

FIG. 1 illustrates a block diagram of one embodiment of an electronic system 100 including a capacitance sensor 101 that may include one or more capacitance sensing RX channels. These sensing channels may utilize a compensation circuit to minimize the effect of baseline charge. In one embodiment, a multiplexer circuit may be used to connect the capacitance sensor 101 with a sensor element array 121. The electronic system 100 includes a touch-sensing surface 116 (e.g., a touchscreen, or a touch pad) coupled to the processing device 110, which is coupled to a host 150. In one embodiment, the touch-sensing surface 116 is a two-dimensional user interface that uses a sensor element array 121 to detect touches on the surface 116.

In one embodiment, the sensor element array 121 includes sensor elements 121(1)-121(N) (where N is a positive integer) that are disposed as a two-dimensional matrix (also referred to as an XY matrix). The sensor element array 121 is coupled to pins 113(1)-113(N) of the processing device 110 via one or more analog buses 115 transporting multiple signals. In an alternative embodiment without an analog bus, each pin may instead be connected either to a circuit that generates a TX signal or to an individual RX sensor circuit.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output (i.e., density domain), instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor element array 121, such as whether an object (e.g., a finger) is detected on or in proximity to the sensor element array 121 (e.g., determining the presence of the object), resolve where the object is on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor element array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
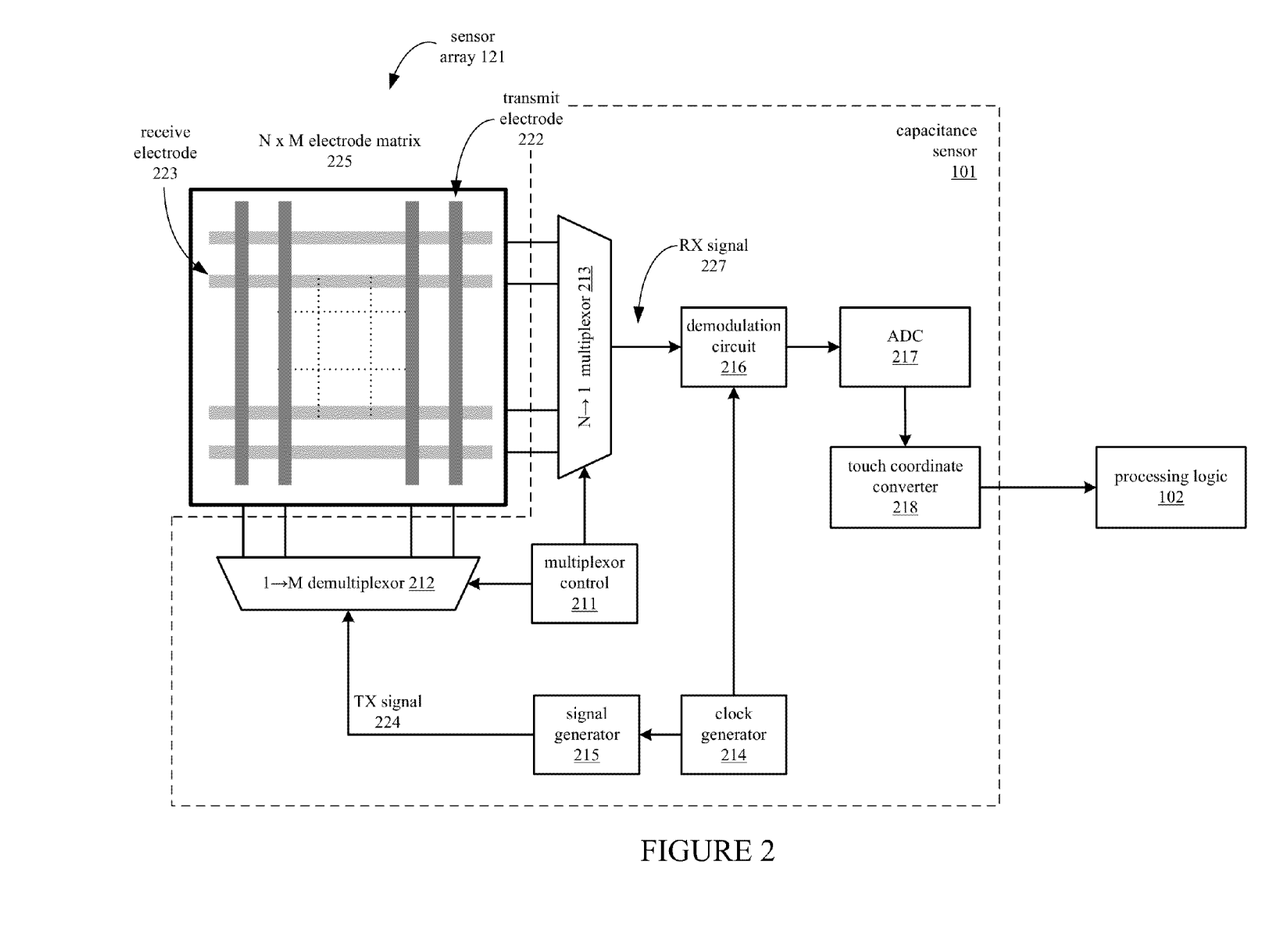
FIG. 2 is a block diagram illustrating an embodiment of an electronic system that processes touch sensor data.

FIG. 2 is a block diagram illustrating one embodiment of an array of capacitive touch sensor elements 121 and a capacitance sensor 101 that converts changes in measured capacitances to coordinates indicating the presence and location of touch. In one embodiment, the capacitance sensor 101 may measure a mutual capacitance between each pair of sensor elements in the array 121, where each mutual capacitance measurement is associated with an intersection of the corresponding pair of sensor elements. The touch coordinates are calculated based on changes in the measured capacitances relative to the capacitances of the same touch sensor element array 121 in an un-touched state. In one embodiment, sensor element array 121 and capacitance sensor 101 are implemented in a system such as electronic system 100. Sensor element array 121-includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 101 through demultiplexer 212 and multiplexer 213. In an alternative embodiment, each of the electrodes in matrix 225 may be connected to a dedicated RX or TX pin, rather than being connected through a demultiplexer or multiplexer.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be measured by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When a conductive object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining changes in the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected, and the associated magnitude of capacitance change at each respective electrode.

The induced current signal 227 is integrated by demodulation circuit 216. The rectified current output by demodulation circuit 216 can then be filtered and converted to a digital code by ADC 217.

A series of such digital codes measured from adjacent sensor intersections, when compared to, or offset by, the associated codes of these same sensors in an un-touched state, may be converted to touch coordinates indicating a position of an input on touch sensor element array 121 by touch coordinate converter 218. The touch coordinates may then be used to detect gestures or perform other functions by the processing logic 102.

In one embodiment, a capacitance sensor such as capacitance sensor 101 may compensate for a baseline amount of charge induced at one of the receive electrodes 223 by adding or subtracting a repeatable programmable amount of charge. This may be accomplished by injecting a current into the RX input to deliver an amount of charge I×T=Q, where I represents amplitude, T represents duration, and Q represents the amount of charge injected.

In one embodiment where the capacitance sensor detects capacitance using a full-wave rectification, the baseline compensation may operate in both positive and negative phases of the TX pulse. The compensation circuitry may thus subtract charge during one phase of the TX pulse and add charge during the opposite phase.

Figure 3A:
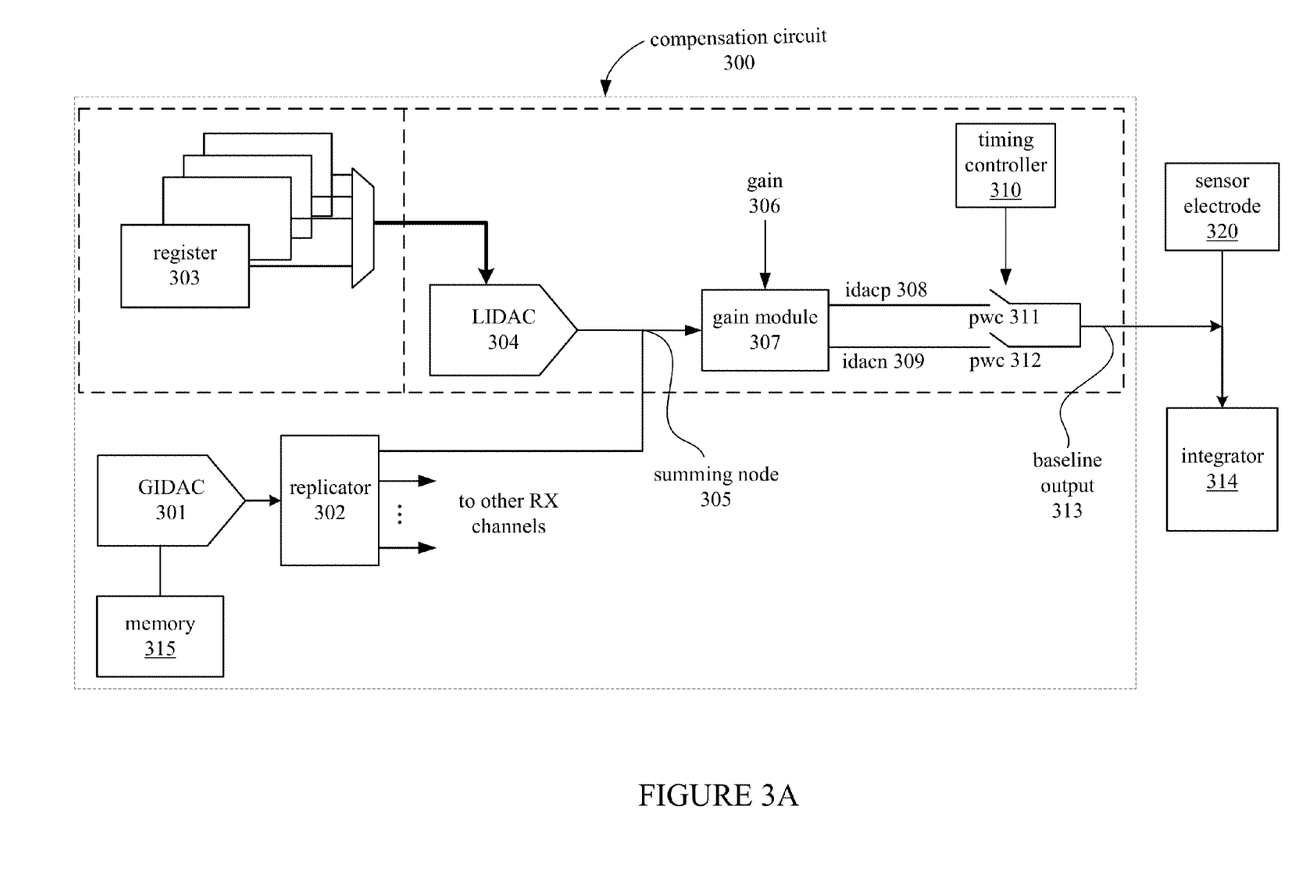
FIG. 3A illustrates an embodiment of a compensation circuit.

FIG. 3A illustrates an embodiment of a compensation circuit 300 that uses a global current digital-to-analog converter (GIDAC) 301 and a local current digital-to-analog converter (LIDAC) 304 to generate current pulses to compensate for baseline effects in a capacitance sensing system. In one embodiment, the current generated by the compensation circuit 300 may be used to offset a baseline RX current from the sensor electrode 320. GIDAC 301 generates a current that is replicated by a current replicator 302. Each of the replicated currents is distributed to one of a number of RX channels.

Given a fixed pulse width, the current generated by the GIDAC 301 approximates an amplitude for delivering the baseline amount of charge, while an additional current generated by the LIDAC 304 may be added to the GIDAC current at summing node 305 to more closely match the final amount of charge to be delivered. In one embodiment, the GIDAC 301 may be programmed to output a current having an amplitude specified by an amplitude value stored in memory 315.

The gain module 307, controlled by a gain signal 306, may be used to change the gain and sign of the summed current received from summing node 305. In one embodiment, the gain module 307 may generate the positive and negative currents idacp 308 and idacn 309 based on the summed current. A global timing controller 310 may then be used to operate switches pwc 311 and pwc 312 to apply the positive and negative current pulses, as appropriate, to the integrator 314 of the capacitance sensor. For example, the positive and negative pulses may be applied to the RX integrator 314 during the negative and positive TX periods, respectively. In one embodiment, the timing controller 310 may be implemented using a counter.

Figure 3B:
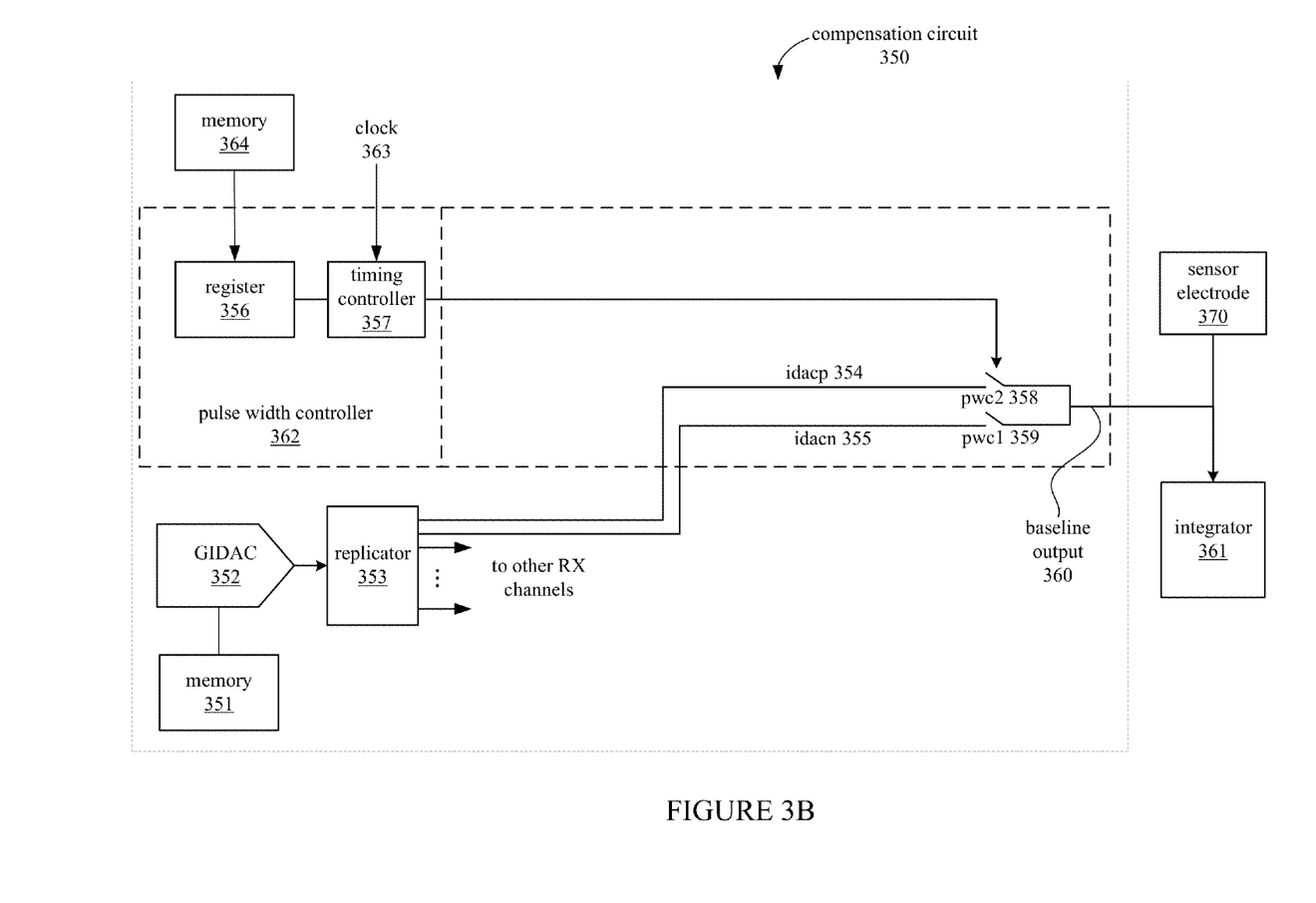
FIG. 3B illustrates an embodiment of a compensation circuit.

FIG. 3B illustrates an embodiment of a compensation circuit 350. In one embodiment, the compensation circuit 350 may include a current source 352 that is configured to control an amplitude of a current pulse and a pulse width controller 362 that is configured to control a duration of the current pulse. In one embodiment, these parts of the compensation circuit function as a current pulse generator, where the current pulse generator controls the duration of a current pulse based on a duration value, and applies the current pulse to a compensation node of a capacitance sensor during a measurement cycle of an intersection corresponding to the duration value. In one embodiment, the current generated by the compensation circuit 350 may be used to offset a baseline RX current from the sensor electrode 370.

Thus, while the compensation circuit 300 generates current pulses having fixed duration and varying amplitudes by adding the GIDAC 301 and LIDAC 304 currents together, the compensation circuit 350 may instead adjust the amount of charge delivered with each current pulse by controlling the pulse width. Thus, instead of using LIDACs to compensate for local baseline variations, the local baseline variations may be compensated by increasing or decreasing the width of the current pulse.

In the compensation circuit 350, the baseline compensation may be accomplished using a global IDAC (GIDAC) 352 and local (per channel) adjustment of the pulse width. The GIDAC 352 delivers sufficient charge to compensate even the RX channels having the worst case baseline effects, while the pulse width controller makes a final adjustment to the amount of charge delivered to each channel.

In one embodiment, the additional expense of a LIDAC for each RX channel is avoided, and the baseline compensation for each channel is achieved using one or more registers, such as register 356, and timing controller 357 to control the timing of PWC switches 358 and 359.

In one embodiment, the compensation circuit 350 is configured to output a current pulse at baseline output 360, which is connected to a compensation node of a capacitance sensor. In one embodiment, the compensation node may be an input of an integrator 361 of a capacitance sensor. The integrator 361 may be configured to integrate charge received from one of the RX sensor electrodes 370 in the form of an RX current; thus, the charge delivered to the integrator 361 at the baseline output 360 serves to offset the baseline charge integrated from the RX sensor electrode 370.

In one embodiment, the compensation circuit 350 includes a current source that is programmable to output a current having a predetermined amplitude. For example, the current source may be a current-mode D/A converter, or IDAC. The global IDAC (GIDAC) 352 may be programmed to output a current having an amplitude specified by an amplitude value stored in memory 351. In one embodiment, the current level of GIDAC 352 may be programmed to a value large enough to inject sufficient current into any of the client RX channels. In one embodiment, the GIDAC 352 (or other current source) may be capable of both supplying and sinking current, to generate both positive and negative currents for compensating both true and complement signals.

In alternative embodiments, the GIDAC 352 may be replaced with one or more other types of current sources, such as a switched capacitor, or resistor connected to a reference voltage or to ground. In one embodiment where a resistor and voltage source are used as a current source, the predetermined current may be determined by the resistor value and voltage level of the voltage source.

In one embodiment, the compensation circuit 350 may also include a memory, such as memory 351, that is coupled with the current source GIDAC 352. The memory 351 may store a number of values each indicating an output current level for the GIDAC 352. In one embodiment, the GIDAC 352 is configured to output currents these different output levels at different times. The amplitudes of the current pulses generated by the compensation circuit can thus be adjusted based on the amplitude values stored in the memory 351.

In one embodiment, the GIDAC 352 output may be changed for each row, column, or intersection being sensed. The sequence of this change may be controlled by a CPU or sequencer by reprogramming the GIDAC 352 during a capacitance measurement scan of an array of sensor electrodes. For example, in a system where a TX signal is applied to successive TX sensor electrodes, the GIDAC 352 may be reprogrammed to output a different current level every time the TX signal is applied to a different TX sensor electrode. In an alternative embodiment, the GIDAC 352 may be reprogrammed to output a different current level for each TX-RX intersection that is sensed.

In one embodiment, a replicator 353 may be connected to the GIDAC 352 and may generate multiple replicated currents based on the current output by the GIDAC 352, with each of the replicated currents being supplied to a different client RX channel. In one embodiment, the replicated currents are each equal to the GIDAC 352 output current. In one embodiment, the replicator generates as many replicated currents as there are RX channels.

In one embodiment, the replicator 353 generates a positive current idacp 354 and a negative current idacn 355 based on the output of the GIDAC 352. In one embodiment, regardless of the sign, the amplitudes of currents 354 and 355 may be approximately equal to the output current of GIDAC 352. In one embodiment, the replicator 353 may similarly generate a positive and negative current for each of the client RX channels.

In one embodiment, the compensation circuit 350 includes a pulse width controller 362 that is configured to control a duration of the current pulse based on a duration value. In one embodiment, the duration value may be stored in a register 356.

For each RX channel, the pulse width controller 32 may control the amount of time that the GIDAC 352 current is allowed to flow into the compensation node (i.e., the integrator 361 input) by operating the switches 358 and 359 based on the PWC signals. In one embodiment the amount of charge injected into the compensation node is determined by the amplitude of the current pulse times the duration. Thus a longer duration increases the amount of charge that is injected into the compensation node.

In one embodiment, this baseline compensation by injecting charge into the integrator input may further reduce the burden on the integrator operational amplifier by reducing the amount of inrush current coming from the RX sensor electrode.

In one embodiment, the PWC 362 may be clocked by a relatively high clock rate to allow the pulse durations to be adjusted with a high time resolution. For example, a clock 363 having a frequency of 33 MHz may be used to clock the PWC 362. This results in PWC timing increments of about 30 ns.

In one embodiment, the compensation circuit 350 may generate a current pulse based on the GIDAC 352 and PWC 362 settings that has a high amplitude and short duration. This may more closely match the incoming charge from the RX input.

In one embodiment, the compensation circuit 350 includes a memory 364 configured to store a number of duration values for controlling the duration of the current pulse. In one embodiment, each duration value may specify a duration of a current pulse to be applied to the compensation node during the measurement cycle for a set of sensor electrodes, which may include one or more sensor electrodes. In one embodiment, a set of two sensor electrodes may correspond to an intersection between those sensor electrodes.

In one embodiment, the duration values stored in memory 364 may be loaded into the register 356 to control the timing controller 357.

In one embodiment, the PWC timing controller 357 may be operated on a per-channel basis to close the switches 358 and 359 for different durations depending on the sensor electrode or intersection between sensor electrodes for which capacitance is being measured. In one embodiment, the timing controller 357 may be implemented using a counter.

In one embodiment, when an intersection is being measured, a duration value corresponding to that intersection is loaded from memory 364 into register 356. The timing controller 357 then operates the switches 358 and 359 based on the duration value in register 356.

In one embodiment, the compensation circuitry 350 includes the two PWC switches 358 and 359, which are configured to control the timing of the negative and positive phases of the baseline compensation process independently. Switch 358 connects positive current idacp 354 with the compensation node, and switch 359 connects the negative current idacn 355 with the compensation node.

In one embodiment, both of the switches 358 and 359 can be controlled by a single duration value stored in register 356. In an alternative embodiment, each of the switches 358 and 359 are controlled independently by different register values.

Figure 4:
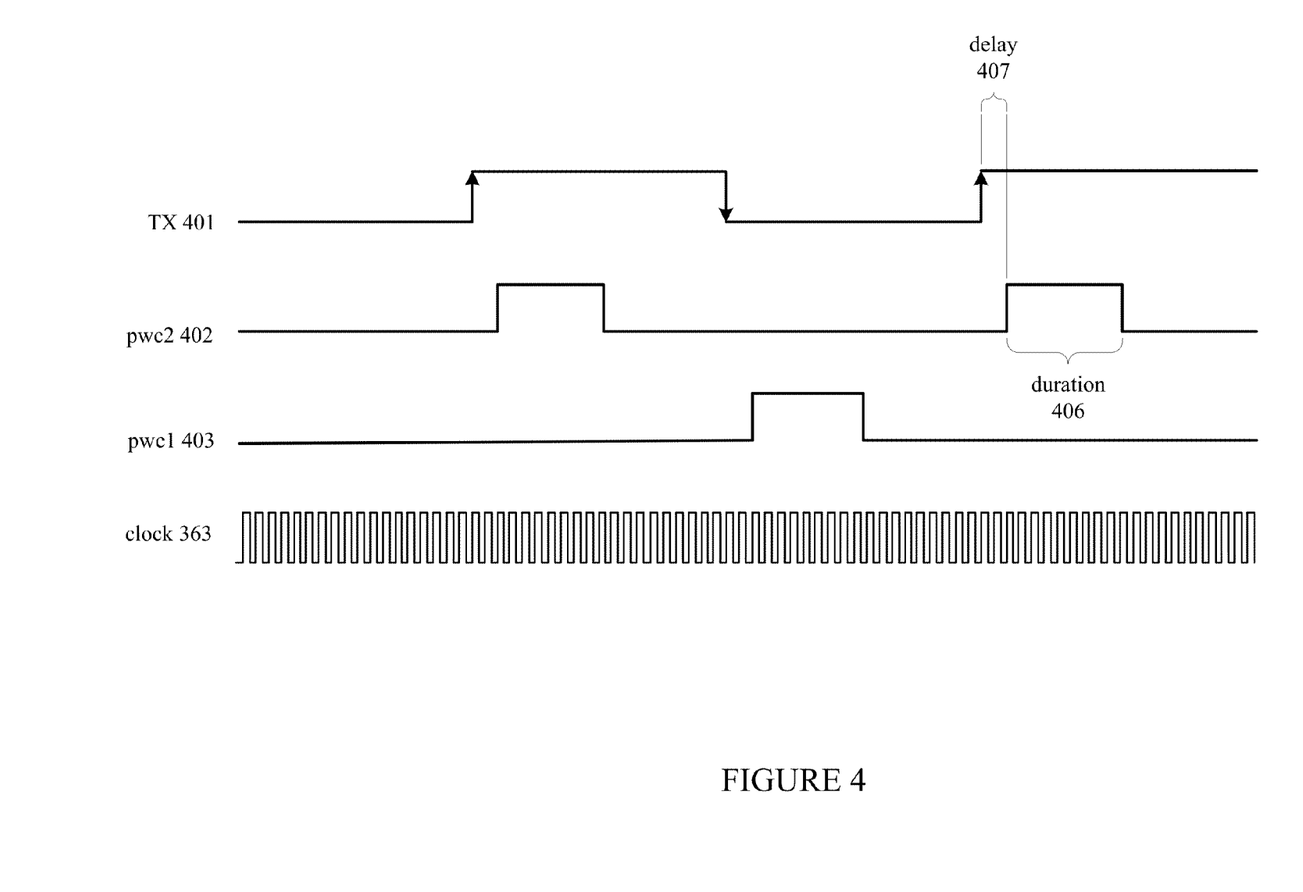
FIG. 4 is a timing diagram illustrating signals for a compensation circuit, according to an embodiment.

FIG. 4 is a timing diagram illustrating the relationships between the TX signal 401, the PWC switching signals 402 and 403, and the clock signal 404. In one embodiment, TX 401 represents a TX signal that is applied to a TX sensor electrode, such as sensor electrode 222. The PWC2 402 and PWC1 403 signals represent the signals for closing switches PWC2 358 and PWC1 359, respectively. The duration 406 determines the duration of the current pulse resulting from closing switch 402, and may be determined by the duration value in register 356. The clock signal 363 is the clock signal applied to the timing controller 357, as illustrated in FIG. 3B.

As illustrated in FIG. 4, the closing of switch 402 is timed to correspond to the beginning of each positive cycle of the TX signal 401. Switch 403 is similarly closed during each negative cycle of TX signal 401. In one embodiment, the switches 402 may be closed at the beginning of each positive or negative cycle of the TX signal 401. Alternatively, a programmable delay, such as delay 507 between a rising edge of TX signal 401 and the closing of switch 402, may be used to time-align the compensation current pulse with inrush RX current received from the RX sensor electrode. In particular, delay 407 delays the closing of switch 402 by two clock cycles from the rising edge of TX 401.

Figure 5:
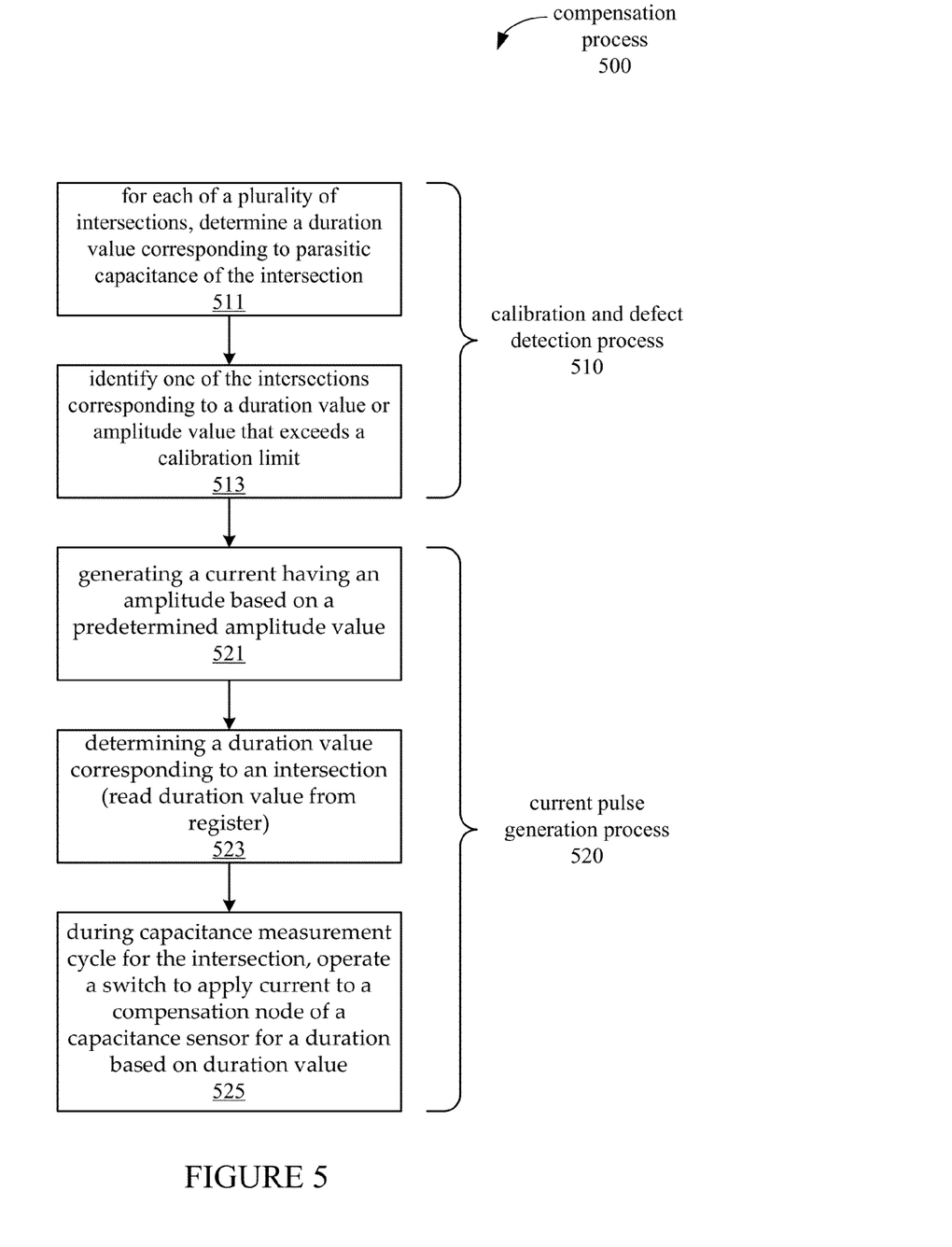
FIG. 5 is a flow diagram illustrating an embodiment of a compensation process.

FIG. 5 is a flow diagram illustrating a compensation process 500, according to one embodiment. The compensation process may be performed by a compensation circuit such as compensation circuit 350, as illustrated in FIG. 3B. In one embodiment, the compensation process 500 may begin with a calibration process 510, which may also be used to identify defects in an array of sensor electrodes. Once calibration has taken place, the compensation circuit may be used to perform a current pulse generation process 520 to generate a current pulse to deliver an amount of charge to compensate for a baseline capacitance of a sensor electrode. In one embodiment, some of the operations of process 500 may be performed using or initiated by processing logic such as processing logic 102, as illustrated in FIG. 1.

In one embodiment, the calibration process 510 may be used to obtain a set of duration values each associated with an intersection between a pair of sensor electrodes in an array of sensor electrodes. The calibration process 510 begins at block 511. At block 511, for each intersection of the array of sensor electrodes, the compensation circuitry may be used to determine a duration value corresponding to the intersection by minimizing a baseline current caused by a parasitic capacitance of the intersection. For example, parasitic capacitance may exist between the intersecting sensor electrodes.

In one embodiment, this calibration process may occur during a period when no touches are detected at the touch-sensing surface. During this process, global and local baseline values can be stored in the corresponding registers or memory. For instance, during the calibration process of block 511, the system may calculate amplitude values and duration values that can be used to deliver the correct amount of compensating charge for minimizing the baseline charge for each intersection. These amplitude values and duration values may then be stored for later recall and use.

In one embodiment, the duration values or the amplitude values may be updated during normal operation of the touch surface. For example, recalibration may be triggered in response to detecting that environmental conditions such as temperature and humidity have sufficiently changed the touch panel characteristics, or have exceeded some threshold value.

In one embodiment, the GIDAC amplitude values that are determined during the calibration process are unique to each individual TX row (or column) intersection on the touch panel.

In one embodiment, the process 500 may continue from block 511 to block 513, where at least one intersection may be identified as corresponding to a duration value or amplitude value that exceeds one or more calibration limits, which may be defined as a range of acceptable values. In one embodiment, any duration or amplitude values as determined by the calibration process that exceed the calibration limits may be used to indicate a failure or manufacturing defect in the array of sensor electrodes.

In one embodiment, the calibration and defect detection process 510 may be followed by a current pulse generation process 520. In one embodiment, the current pulse generation process 520 includes blocks 521-525 and uses the duration and amplitude values determined by the calibration process 510 to generate a current pulse.

The process 520 begins at block 521, where the compensation circuitry generates a current having an amplitude that is based on a predetermined amplitude value, such as one of the amplitude values determined by the calibration process 510. In an alternative embodiment, the predetermined amplitude value may be set by a value of a resistor or other component. For example, a predetermined amplitude may be set by the resistor value in an embodiment where a resistor connected to a voltage source is used as a current source.

In one embodiment, as TX signals are applied to successive TX sensor electrodes, the corresponding amplitude values, stored in registers or other memory, may be applied to the GIDAC during the capacitance measurement cycle of the RX sensor electrodes. In one embodiment, the same embedded sequencer used to control the application of the TX signals to the TX sensor electrodes is also used to apply the corresponding amplitude values to the GIDAC; alternatively, this function may be performed by a CPU or other processing logic.

From block 521, the process 520 continues at block 523. At block 523, a duration value is identified that corresponds to an intersection or subset of intersections presently being sensed. In one embodiment, the duration value may be determined by reading the duration value from a register or other memory. For example, a duration value may be read from a register or other memory based on a signal from an embedded sequencer or other logic indicating the intersection that is being sensed. This signal may be used to select the duration value corresponding to the sensed intersection.

From block 523, the process 500 continues at block 525. At block 525, during a capacitance measurement cycle of the intersection, the compensation circuit operates a switch to apply the current to a compensation node of a capacitance sensor for a duration that is based on the duration value.

For example, with reference to compensation circuit 350 of FIG. 3B, the pulse width controller 362 may operate the switches 358 and 359 to apply the current generated by GIDAC 352 to the compensation node (which is the input of integrator 361). The pulse width controller 362 closes the switches 358 and 359 for a duration indicated by a duration value stored in register 356. In one embodiment, the timing controller 357 outputs signals 402 and 403 (as illustrated in FIG. 4) to close the switches 358 and 359, respectively, for the appropriate durations.

In one embodiment, the compensation node is coupled with the input of integrator 361 such that the generated current pulse is applied to the integrator input while the charge from the RX sensor electrode is being integrated over time.

In alternative embodiments, the compensation circuit as described above may be used to compensate for baseline capacitances in a system that measures self capacitances of sensor electrodes. For example, memory 364 may be used to store duration values each associated with a set of one or more sensor electrodes. The duration values corresponding to the set of sensor elements may then be used to control the pulse width of a current pulse during a self capacitance measurement cycle for the set of sensor elements.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A compensation circuit, comprising:
   a current source configured to control an amplitude of a current pulse;
   a memory configured to store a plurality of duration values each corresponding to a set of one or more sensor electrodes of a plurality of sensor electrodes; and
   a pulse width controller configured to control a duration of the current pulse based on a first duration value of the plurality of duration values, and to add the current pulse to a measurement current generated by a measurement cycle of a first set of one or more sensor electrodes by applying the current pulse to a compensation node of a capacitance sensor during the measurement cycle for the first set of one or more sensor electrodes, wherein the first set of one or more sensor electrodes corresponds to the first duration value.

2. The compensation circuit of claim 1, wherein the first set of one or more sensor electrodes comprises a pair of sensor electrodes, and wherein the measurement cycle comprises a time for measuring a mutual capacitance between the pair of sensor electrodes.

3. The compensation circuit of claim 1, wherein the capacitance sensor further comprises an integrator coupled with the compensation node, wherein the integrator is configured to integrate charge from a sensor electrode.

4. The compensation circuit of claim 1, further comprising a second memory coupled with the current source, wherein the memory stores a plurality of values each indicating an output current level for the current source.

5. The compensation circuit of claim 4, wherein the current source is configured to generate current at each of the output current levels over time.

6. The compensation circuit of claim 1, further comprising a switch coupling the current source with the compensation node, wherein the pulse width controller is further configured to operate the switch based on the duration value.

7. The compensation circuit of claim 1, further comprising a current replicator coupled with the current source, wherein the current replicator is configured to generate a plurality of replicated currents based on a current generated by the current source.

8. A compensation circuit, comprising:
a memory configured to store a plurality of duration values each associated with a set of sensor electrodes including one or more of a plurality of sensor electrodes;
a current pulse generator coupled with the memory, wherein the current pulse generator is configured to control a duration of a current pulse based on a first duration value of the plurality of duration values that corresponds to a first set of sensor electrodes, and add the current pulse to a measurement current generated by a measurement cycle of the first set of one or more sensor electrodes by applying the current pulse to a compensation node of a capacitance sensor during the measurement cycle of the first set of sensor electrodes.

9. The compensation circuit of claim 8, wherein the first set of one or more sensor electrodes comprises a pair of sensor electrodes, and wherein the measurement cycle comprises a time for measuring a mutual capacitance between the pair of sensor electrodes.

10. The compensation circuit of claim 8, wherein the capacitance sensor further comprises an integrator coupled with the compensation node, wherein the integrator is configured to integrate charge from a sensor electrode.

11. The compensation circuit of claim 8, wherein the current pulse generator further comprises a current source.

12. The compensation circuit of claim 11, further comprising a current replicator coupled with the current source, wherein the current replicator is configured to generate a plurality of replicated currents based on a current generated by the current source.

13. The compensation circuit of claim 8, further comprising a second memory coupled with the current pulse generator, wherein the current pulse generator is configured to control an amplitude of the current pulse based on one of a plurality of amplitude value stored in the second memory.

14. The compensation circuit of claim 8, wherein the current pulse generator further comprises a pulse width controller.

15. The compensation circuit of claim 14, wherein the current pulse generator further comprises a switch coupling a current source with the compensation node, and wherein the pulse width controller is configured to control the duration of the current pulse by controlling the switch.

16. A method, comprising:
generating a current having an amplitude based on a predetermined amplitude value;
determining a duration value corresponding to one or more sensor electrodes of a plurality of sensor electrodes; and
during a capacitance measurement cycle for the one or more sensor electrodes, operating a switch to add a pulse of the current to a measurement current generated by a measurement cycle of a first set of one or more sensor electrodes by applying the current to a compensation node of a capacitance sensor for a duration based on the duration value.

17. The method of claim 16, wherein the one or more sensor electrodes comprises a pair of sensor electrodes, and wherein the capacitance measurement cycle comprises a time for measuring a mutual capacitance between the pair of sensor electrodes.

18. The method of claim 16, further comprising, for each of a plurality of intersections between pairs of the sensor electrodes, determining a duration value by minimizing a baseline current corresponding to a parasitic capacitance of the intersection.

19. The method of claim 17, further comprising identifying one of the plurality of intersections corresponding to a duration value that exceeds one or more calibration limits.

20. The method of claim 16, wherein the compensation node is coupled with an integrator of the capacitance sensor, and wherein the current is applied to the compensation node while the capacitance sensor integrates charge from a sensor electrode associated with the intersection.

* * * * *